United States Patent [19]
Arimilli et al.

[11] Patent Number: 6,105,112
[45] Date of Patent: Aug. 15, 2000

[54] DYNAMIC FOLDING OF CACHE OPERATIONS FOR MULTIPLE COHERENCY-SIZE SYSTEMS

[75] Inventors: Ravi Kumar Arimilli, Austin; John Steven Dodson, Pflugerville; Jerry Don Lewis, Round Rock; Derek Edward Williams, Austin, all of Tex.

[73] Assignee: International Business Machines Corporation, Armonk, N.Y.

[21] Appl. No.: 08/834,120

[22] Filed: Apr. 14, 1997

[51] Int. Cl.[7] .................................................. G06F 12/00
[52] U.S. Cl. ........................... 711/141; 711/118; 711/139; 711/144
[58] Field of Search ..................................... 711/122, 144, 711/146, 3, 142, 141; 395/800, 683, 800.12, 200.8; 707/8; 345/512

[56] References Cited

U.S. PATENT DOCUMENTS

| | | | |
|---|---|---|---|
| 5,307,504 | 4/1994 | Robinson et al. | 395/800 |
| 5,325,503 | 6/1994 | Stevens et al. | 711/146 |
| 5,369,753 | 11/1994 | Tipley | 711/122 |
| 5,398,325 | 3/1995 | Chang et al. | 711/3 |
| 5,485,626 | 1/1996 | Lawlor et al. | 395/683 |
| 5,546,579 | 8/1996 | Josten et al. | 707/8 |
| 5,577,227 | 11/1996 | Finnell et al. | 711/122 |
| 5,579,504 | 11/1996 | Callander et al. | 711/144 |
| 5,675,823 | 10/1997 | Hsiao | 395/800.12 |
| 5,696,937 | 12/1997 | White et al. | 711/142 |
| 5,802,288 | 9/1998 | Ekanadham et al. | 395/200.8 |
| 5,867,180 | 2/1999 | Katayama et al. | 345/512 |

*Primary Examiner*—John W. Cabeca
*Assistant Examiner*—Fred F. Tzeng
*Attorney, Agent, or Firm*—Richard A. Henkler; Jack V. Musgrove; Andrew J. Dillon

[57] ABSTRACT

A method is disclosed of managing architectural operations in a computer system whose architecture includes components having varying coherency granule sizes. A queue is provided for receiving as entries a plurality of the architectural operations, the entries of the queue are compared with a new architectural operation to determine if the new architectural operation is redundant with any of the entries. If the new architectural operation is not redundant with any of the entries, it is loaded in the queue. The computer system may include a cache having a processor granularity size and a system bus granularity size which is larger than the processor granularity size, and the architectural operations are cache instructions. The comparison may be performed in an associative manner based on the varying coherency granule sizes.

6 Claims, 2 Drawing Sheets

DYNAMIC FOLDING OF CACHE OPERATIONS FOR MULTIPLE COHERENCY-SIZE SYSTEMS

BACKGROUND OF THE INVENTION

1. Field of the Invention

The present invention generally relates to computer systems and, more particularly, to a method of optimizing architectural-level operations such as cache instructions.

2. Description of the Related Art

The basic structure of a conventional computer system 10 is shown in FIG. 1. Computer system 10 may have one or more processing units, two of which 12a and 12b are depicted, which are connected to various peripheral devices, including input/output (I/O) devices 14 (such as a display monitor, keyboard, and permanent storage device), memory device 16 (such as random access memory or RAM) that is used by the processing units to carry out program instructions, and firmware 18 whose primary purpose is to seek out and load an operating system from one of the peripherals (usually the permanent memory device) whenever the computer is first turned on. Processing units 12a and 12b communicate with the peripheral devices by various means, including a generalized interconnect or bus 20. Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter might be used to control a video display monitor, a memory controller can be used to access memory 16, etc. Also, instead of connecting I/O devices 14 directly to bus 20, they may be connected to a secondary (I/O) bus which is further to an I/O bridge to bus 20. The computer can have more than two processing units.

In a symmetric multi-processor (SMP) computer, all of the processing units are generally identical, that is, they all use a common set or subset of instructions and protocols to operate, and generally have the same architecture. A typical architecture is shown in FIG. 1. A processing unit includes a processor core 22 having a plurality of registers and execution units, which carry out program instructions in order to operate the computer. An exemplary processing unit includes the PowerPC™ processor marketed by International Business Machines Corporation. The processing unit can also have one or more caches, such as an instruction cache 24 and a data cache 26, which are implemented using high-speed memory devices. Caches are commonly used to temporarily store values that might be repeatedly accessed by a processor, in order to speed up processing by avoiding the longer step of loading the values from memory 16. These caches are referred to as "on-board" when they are integrally packaged with the processor core on a single integrated chip 28. Each cache is associated with a cache controller (not shown) that manages the transfer of data between the processor core and the cache memory.

A processing unit 12 can include additional caches, such as cache 30, which is referred to as a level 2 (L2) cache since it supports the on-board (level 1) caches 24 and 26. In other words, cache 30 acts as an intermediary between memory 16 and the on-board caches, and can store a much larger amount of information (instructions and data) than the on-board caches can, but at a longer access penalty. For example, cache 30 may be a chip having a storage capacity of 256 or 512 kilobytes, while the may be an IBM PowerPC™ 604- series processor having on-board caches with 64 kilobytes of total storage. Cache 30 is connected to bus 20, and all loading of information from memory 16 into processor core 22 must come through cache 30. Although FIG. 1 depicts only a two-level cache hierarchy, multi-level cache hierarchies can be provided where there are many levels of serially connected caches.

A cache has many blocks or lines which individually store the various instructions and data values. An exemplary cache line (block) includes an address tag field, a state bit field, an inclusivity bit field, and a value field for storing the actual instruction or data. The state bit field and inclusivity bit fields are used to maintain cache coherency in a multi-processor computer system (indicate the validity of the value stored in the cache). The address tag is a subset of the full address of the corresponding memory block. A compare match of an incoming effective address with one of the tags within the address tag field indicates a cache "hit." The collection of all of the address tags in a cache (and sometimes the state bit and inclusivity bit fields) is referred to as a directory, and the collection of all of the value fields is the cache entry array. The cache 30 of FIG. 1 depicts such a cache entry array 32 and a cache directory 34.

When all of the blocks in a set for a given cache are full and that cache receives a request, whether a "read" or "write," to a memory location that maps into the full set, the cache must "evict" one of the blocks currently in the set. The cache chooses a block by one of a number of means known to those skilled in the art (least recently used (LRU), random, pseudo-LRU, etc.) to be evicted. An LRU unit is depicted in FIG. 1. If the data in the chosen block is modified, that data is written to the next lowest level in the memory hierarchy which may be another cache (in the case of the LI or on-board cache) or main memory (in the case of an L2 cache, as depicted in the two-level architecture of FIG. 1). By the principle of inclusion, the lower level of the hierarchy will already have a block available to hold the written modified data. However, if the data in the chosen block is not modified, the block is simply abandoned and not written to the next lowest level in the hierarchy. This process of removing a block from one level of the hierarchy is known as an "eviction." At the end of this process, the cache no longer holds a copy of the evicted block.

A conventional cache has many queues: cacheable store queues 38 (which may include read and write queues for each of the cache directory, cache entry array, and other arrays, to fetch data coming in to reload this cache); a cacheinhibited store queue 40; a snoop queue 42 for monitoring requests to, e.g., intervene some data; and a cache operations queue 44 which handles cache instructions that execute control at an architectural level. For example, the PowerPC™ processor utilizes certain instructions that specially affect the cache, such as a flush instruction, a kill instruction, a clean instruction, and a touch instruction. These instructions are stored in cache operations queue 44.

Cache instructions allow software to manage the cache. Some of the instructions are supervisory level (performed only by the computer's operating system), and some are user level (performed by application programs). The flush instruction (data cache block flush—"dcbf") causes a cache to be made available by invalidating the cache block if it contains an unmodified ("shared" or "exclusive") copy of a memory block or, if the cache block contains a modified copy of a memory block, then by first writing the modified value downward in the memory hierarchy (a "push"), and thereafter invalidating the block. The kill instruction (data cache block invalidate—"dcbi," instruction cache block invalidate—"icbi," or data cache block set to zero—"dcbz") is similar to the flush instruction except that a kill instruction immediately forces a cache block to an invalidate state, so any modified block is killed without pushing it out of the cache. The clean instruction (data cache block store— "dcbst") causes a block that has been modified to be written to main memory; it affects only blocks which have been modified. The touch instruction (data cache block touch— "dcbt") provides a method for improving performance through the use of software-initiated prefetch hints.

All of the foregoing cache instructions operate on a block whose size is referred to as the processor coherency granule. For many computers, the processor coherency granule is 32 bytes, i.e., the processor can operate on a 32-byte sector in a cache block of the L1 cache. The system bus granule may, however, be larger, for example, 64 bytes or 128 bytes, i.e., the full size of the cache line that is transmitted from the L2 cache to the system bus is 64 bytes or 128 bytes. In other words, an instruction sent along the system bus references a 64-byte word or a 128-byte word, not just 32 bytes. Coherency sizes can vary further, for example, having three coherency sizes with a two-level cache (a processor coherency granule of 32 bytes, an L1 coherency granule of 64 bytes, and an L2/system bus coherency granule of 128 bytes).

This variation in coherency size along the memory hierarchy can lead to certain inefficiencies. For example, if a processor issues an "icbi" instruction to a particular 32-byte sector, that instruction will be sent along the system bus and be treated as a 64-byte instruction; then, if the processor immediately issues another "icbi" instruction for another 32-byte sector that was part of the same 64-byte word as the previous instruction, then traditional systems will send a second 64-byte "icbi" instruction to the same 64-byte word, even though a single system bus instruction would have sufficed to kill the two adjacent 32-byte sectors. Another problem can arise when two different processes or threads have issued instructions which result in redundant performance of the same cache instruction. For example, the cache operations queue may include two "icbi" instructions with the same operand, i.e., acting on exactly the same 32-byte cache sector. These instructions are then redundantly repeated.

Another problem relating to the coherency granularity is that a smaller granule increases the number of instructions that are required to complete certain large-scale procedures. For example, a procedure might be performing page-level operations such as copying several pages of memory (a page is a plurality of contiguous memory blocks). If a page were 4 kilobytes and the processor coherency granule were 32 bytes, then a processor performing a flush on an entire page would have to issue 128 "dcbf" instructions, but if the coherency granule were 64 bytes or more, then the number of instructions would be reduced proportionately. This result leads to performance degradation when a procedure is doing many page-level cache operations. Performance is further decreased as the number of processors increases since a processor issuing the cache instructions must wait for snoop responses from all of the other processors before it is sure that the instruction has been completed.

Consider further how a second processor responds to the cache instructions issued by the first processor. If the processor coherency granule is 32 bytes and the system bus granule is 128 bytes, then when the first processor wants to flush a 32-byte sector, the second processor ends up snooping a 128-byte flush. So even though the first processor just wanted to flush a single 32-byte sector, four such sectors will have to be flushed in the cache of the second processor. This problem is exacerbated, however, when page-level cache operations such as those described above are performed, which result in a large number (128) of such 128-byte snooped flushes. The instructions and ensuing responses create a significant amount of address traffic. It would, therefore, be desirable to devise a method of handling large scale architectural operations, such as page-level cache instructions, which decreased bus traffic. It would be further advantageous if the method could result in a decreased number of cache instructions that have to be performed, regardless of variations in the coherency granule of the memory hierarchy, and in quicker execution of those instructions.

SUMMARY OF THE INVENTION

It is therefore one object of the present invention to provide an improved method of handling architectural operations in a computer system, particularly cache instructions.

It is another object of the present invention to provide such a method that reduces inefficiencies associated with the coherency granule size of the memory hierarchy.

It is yet another object of the present invention to provide such a method that takes advantage of variations in the coherency granule size of the memory hierarchy.

The foregoing objects are achieved in a method of managing architectural operations in a computer system whose architecture includes components having varying coherency granule sizes, generally comprising the steps of providing a queue for receiving as entries a plurality of the architectural operations, and comparing the entries of the queue with a new architectural operation to determine if the new architectural operation is redundant with any of the entries. If the new architectural operation is not redundant with any of the entries, it is loaded in the queue. The computer system may include a cache having a processor granularity size and a system bus granularity size which is larger than the processor granularity size, and the architectural operations are cache instructions; said comparing step includes the step of determining if a new cache instruction affects a cache block that is in any system bus granule associated with the queue entries. The comparison may be performed in an associative manner based on the varying coherency granule sizes.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
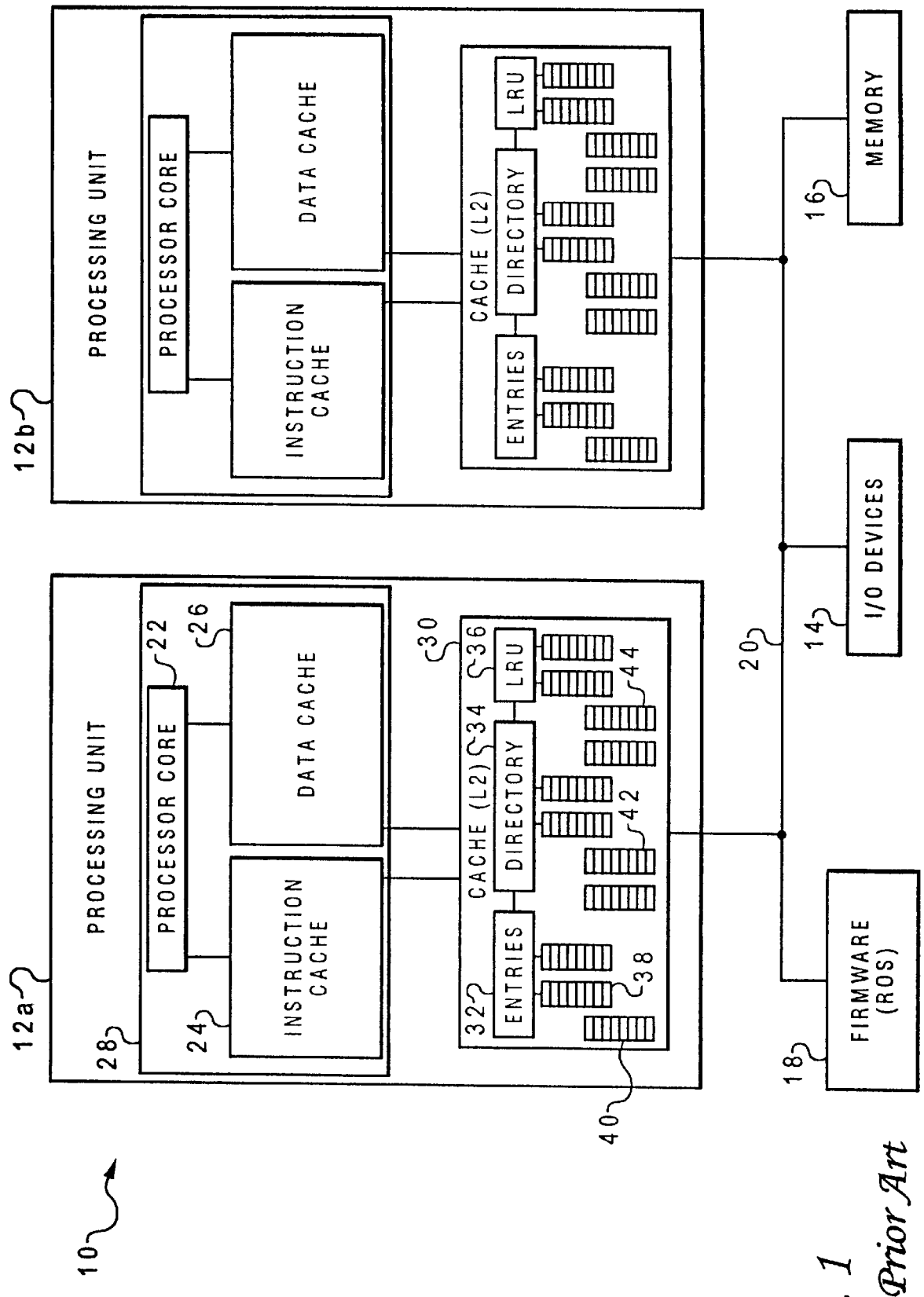
FIG. 1 is a block diagram of a prior art multiprocessor computer system.
Figure 2:
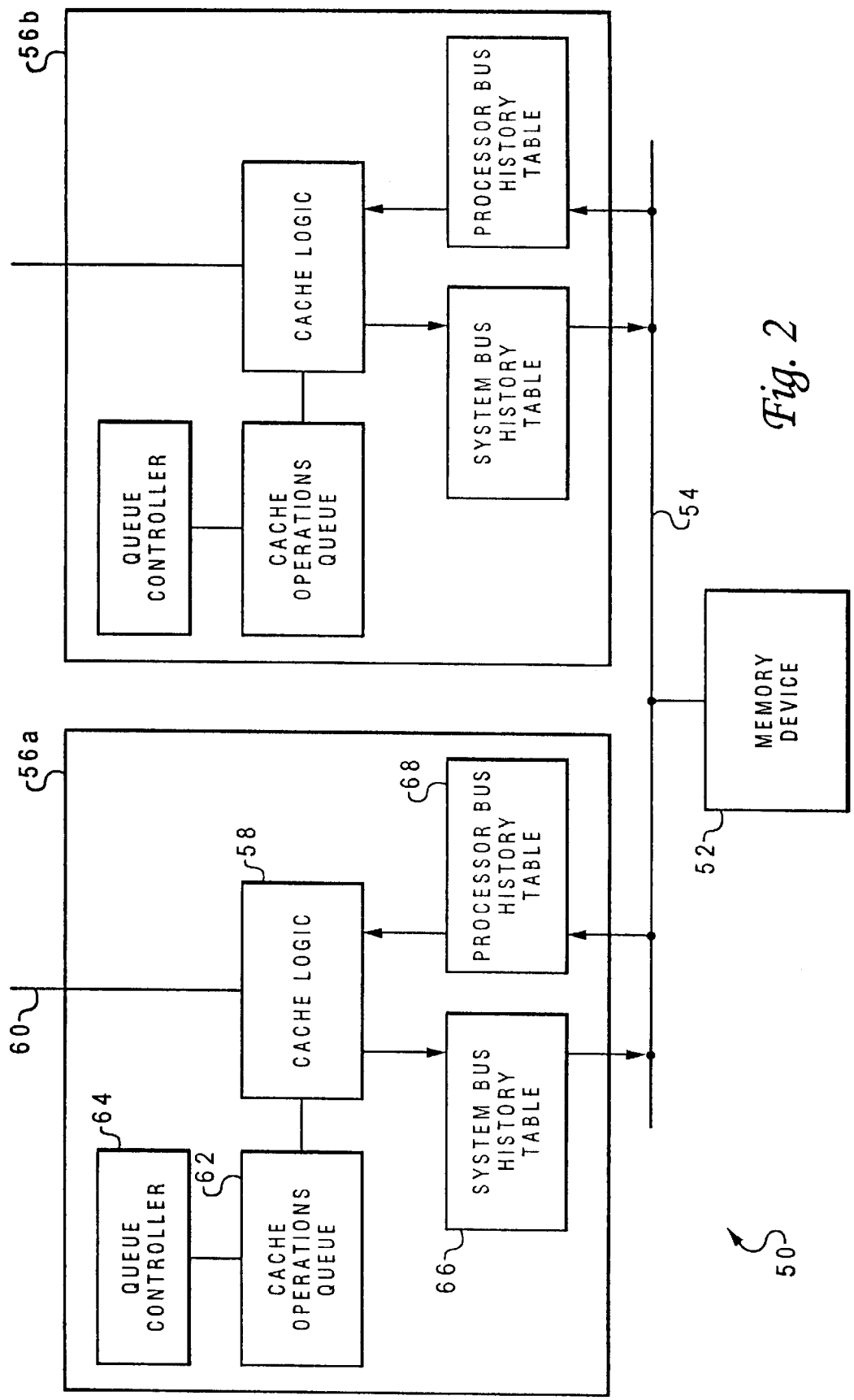
FIG. 2 is a block diagram of one embodiment of a cache construction according to the present invention.

With reference now to the figures, and in particular with reference to FIG. 2, there is depicted one embodiment of a simplified memory hierarchy 50 constructed in accordance with the present invention. Memory hierarchy 50 includes a memory device 52 connected to a system bus 54, and two caches 56a and 56b which are also connected to system bus 54. In the preferred embodiment, each cache 56a, 56b is identical. The memory hierarchy may further includes additional caches if more than two processors are provided in the multiprocessor computer system. Cache 56a has cache logic 58 which includes a cache directory, cache entry array, LRU unit, and appropriate logic to write to the cache lines, detect cache hits, and read stored values. The cache logic is connected to the processor, or a processor side of the memory hierarchy, by processor bus 60. Cache 56a further has one or more queues, including a cache operations queues 62. Cache operations queue 62 contains a serialized list of cache instructions such as those described above in the Description of the Related Art. As noted further below, the cache operations are part of a class of "architectural" operations, generally including any operation other that a load, store or fetch, which results in a bus operation.

In the depicted embodiment, the coherency granule size of memory hierarchy 50 varies. An exemplary implementation uses a 32-byte processor coherency granule, and a system bus coherency granule of 64 bytes. Inefficiencies associated with varying the coherency granule size are lessened by using a queue controller 64 which is connected to cache operations queue 62 and controls what instructions are placed in the queue. Queue controller 64 includes appropriate logic to associatively compare current entries in queue 62 to a new entry which is to be loaded in the queue. If the results of the comparison indicate that it is not necessary to perform the new entry, as it would be redundant with a current entry, then the new entry is dynamically folded into the current entry, i.e., simply not loaded in queue 62.

Consider the following example, a first kill instruction, such as the PowerPC™ "icbi" instruction, is issued by a processor associated with cache 56a, in order to invalidate a first 32-byte sector. This first kill instruction is placed in queue 62. Shortly thereafter (while the first kill instruction is still in the queue), the same processor issues a second "icbi" instruction, this time on a second 32-byte sector, but on a sector which is the complement of the first 32-byte sector based on the coherency granule of the system bus. In other words, the second 32-byte sector is contiguous with the first 32-byte sector in memory device 52. Queue controller 64 will associatively compare the address of the second 32-byte sector with the previous entries in queue 62 to determine if an earlier "icbi" instruction was issued for any addresses which are associated the second 32-byte address by the large system bus granularity. In this example, the result of the comparison will be positive as queue controller will associate the second kill instruction with the first kill instruction that is still in the queue (they are in the same coherency granule). Based on this result, queue controller does not load the second kill instruction into queue 62.

The dynamic folding of a cache instruction into a current queue entry can significantly reduce address operations on system bus. From the processor perspective, the folded instruction was fully executed, but it required no latency. The advantages increase with increasing depth of the cache operations queue, and with increasing system bus coherency granule size. In the depicted embodiment the cache instruction queue is eight deep. The logic required for queue controller 64 is relatively simple, particularly in relation to the benefits achieved.

Caches 56a and 56b utilize another method to minimize inefficiencies associated with varying coherency granule size. As noted above in the Description of Related Art, a cache instruction is often issued as part of a page-level operation, requiring many bus operations to handle the procedure. In the present invention, this concern may be addressed by performing speculatively all appropriate cache operations at the page level. In other words, if a processor issues a cache instruction at a first coherency size, that instruction is translated into a page-level operation that is transmitted to the system bus. This allows for a single bus operation per page affected. By way of comparison, in the prior art it might take 128 32-byte flushes on the system bus to completely flush a page, but this procedure takes only one operation in the present invention. Therefore, the present invention particularly reduces address traffic during times of many page-level cache operations/instructions.

FIG. 2 also shows that each cache has a system bus history table 66. System bus history table 66 keeps track of the last several page-level operations issued to the system bus (speculative or normal). If a page-level operation has recently been executed (as described in the foregoing paragraph) that subsumes a later operation at the level of the processor granularity, then system bus history table 66 acts as a filter to keep the later operation from passing to the system bus. For example, if the processor issued a first flush instruction on a 32-byte sector, this instruction would be translated into a page-level operation, and the address of the accessed page (e.g., a twenty bit address for the page level) would be recorded in system bus history table 66. Thereafter, if the processor issues a second flush instruction for a second 32-byte sector that was still in the same page of the first instruction, then system bus history table 66 realizes that this second flush instruction is unnecessary because the entire page, including the second 32-byte sector, has already been flushed speculatively. In this sense, the issuance of the cache instructions is demand based, i.e., only when necessary.

System bus history table 66 monitors the system bus to ensure that the page-level operations recorded in the table are still valid. If any device performs a system bus operation that may invalidate the effects of a previous page-level operation recorded in system bus history table 66, then that operation is removed from the table. In the exemplary embodiment, the history table is 20 deep.

The cache construction according to the present invention provides further means for minimizing the inefficiencies associated with small coherency granule sizes. Similar to the manner in which the cache may translate an instruction to the system bus at the page level, the cache also may translate a system bus operation to the processor bus at the page level, again in a speculative manner. In other words, if a cache snoops a cache instruction at a first coherency size, that instruction is translated speculatively into a page-level operation that is transmitted to the processor bus. For example, if the cache receives a 32-byte flush instruction from the system bus, it determines which page the 32-byte sector is in, and then sends a multiplicity (e.g., 128) of cache instructions to the processor bus, to completely flush the entire page. A processor bus history table 68 is used to keep track of the last several page-level operations so issued to the processor bus. Thereafter, if the cache receives a later flush instruction for a 32-byte sector which is part of the page already flushed, then processor bus history table 68 acts as a filter to keep the later operation from passing to the processor bus. The issuance of the cache instructions therefore is demand based again.

Even though this method of presenting a page-level operation may require issuing more operations to the processor bus than are actually necessary, in those situations where many page-level operations are issued, the operations retire more quickly, since arbitration is simplified and pipelining is possible. There is just one arbitration step followed by a burst (a page's worth) of cache instructions.

Processor bus history table 68 can be used even if the cache does not generate multiple instructions to translate a low granularity instruction into a page-level operation. For example, processor bus history table 68 can keep track of operations which were transmitted previously to the processor (speculative or normal) as explained above.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, improved performance may be achieved by applying the present invention to any sort of architectural operation, not just cache operations; a history table could be used with a display buffer to improving certain multimedia procedures. The invention is generally applicable to any large scale architectural operation which might be more efficiently handled by speculating that more operations will be required in addition to a single architectural operation. It is therefore contemplated that such modifications can be made without departing from the spirit or scope of the present invention as defined in the appended claims.

We claim:

1. A method of managing cache instructions in a computer system whose architecture includes a cache having a processor granularity size and a system bus granularity size which is larger than the processor granularity size, comprising the steps of:

providing a queue for receiving as entries a plurality of the cache instructions;

comparing the entries of the queue with a new cache instruction to determine if the new cache instruction is redundant with any of the entries, said comparing step including the step of determining if a new cache instruction affects a cache block that is in any system bus granule associated with the queue entries; and if the new cache instruction is not redundant with any of the entries, loading the new cache instruction in the queue.

2. The method of claim 1 wherein said comparing step is performed in an associative manner based on the varying coherency granule sizes.

3. The method of claim 1 further comprising the step of carrying out the cache instructions in a serialized manner.

4. A device for managing cache instructions in a cache having a plurality of cache lines for storing memory blocks from a memory device of a computer system, the cache further having a processor granularity size and a system bus granularity size which is larger than the processor granularity size, comprising:

a queue for receiving as entries a plurality of the cache instructions; and means for folding cache instructions which are redundant into current cache instructions in the queue, said folding means includes a queue controller connected to said queue, said queue controller having means for comparing current entries in said queue to a new entry which is to be loaded in the queue, wherein said folding means loads a cache instruction in said queue if the cache instruction is not redundant with any of said entries.

5. The device system of claim 4 wherein the processor granularity size is 32-bytes and the system bus granularity size is 64 bytes.

6. The device of claim 4 wherein said queue controller performs said comparing in an associative manner based on varying coherency granule sizes.

* * * * *